United States Patent
Pawar et al.

(10) Patent No.: US 12,481,373 B2
(45) Date of Patent: Nov. 25, 2025

(54) METHODS AND APPARATUS FOR ADAPTIVE KEYBOARD SCANNING

(71) Applicant: Intel Corporation, Santa Clara, CA (US)

(72) Inventors: Sagar Pawar, Bangalore (IN); Raghavendra Nagaraj, Bangalore (IN); Prakash Pillai, Bangalore (IN); Ovais Pir, Srinagar (IN); Pannerkumar Rajagopal, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 739 days.

(21) Appl. No.: 17/698,712

(22) Filed: Mar. 18, 2022

(65) Prior Publication Data

US 2022/0206591 A1 Jun. 30, 2022

(51) Int. Cl.
*G06F 3/023* (2006.01)
*G06F 3/02* (2006.01)

(52) U.S. Cl.
CPC ......... *G06F 3/0238* (2013.01); *G06F 3/0219* (2013.01); *G06F 3/0227* (2013.01)

(58) Field of Classification Search
CPC .... G06F 3/0238; G06F 3/0219; G06F 3/0227; G06F 1/3215; G06F 1/3271; H03K 2217/9656; A63F 13/20; A63F 13/44
USPC .............. 345/156, 613; 340/12.23; 382/192; 341/22
See application file for complete search history.

(56) References Cited

U.S. PATENT DOCUMENTS

| | | | | |
|---|---|---|---|---|
| 5,187,480 A * | 2/1993 | Thomas | ................. | G06F 3/018 382/192 |
| 5,451,953 A * | 9/1995 | Duffield | ................ | H04B 1/202 340/12.23 |
| 2002/0124197 A1* | 9/2002 | Atkinson | .............. | G06F 1/3203 713/322 |
| 2003/0051183 A1* | 3/2003 | Lo | ......................... | G06F 1/3203 713/323 |
| 2006/0261982 A1* | 11/2006 | Kong | ...................... | G06F 3/023 341/22 |
| 2008/0184047 A1* | 7/2008 | Goeltzenleuchter | ........................ | G06F 1/3203 713/320 |
| 2009/0289958 A1* | 11/2009 | Kim | ..................... | G06F 3/04886 345/156 |
| 2014/0132340 A1* | 5/2014 | Finch | ..................... | G06F 9/505 327/564 |
| 2016/0109922 A1* | 4/2016 | Chen | ..................... | G06F 1/3287 713/322 |
| 2019/0176033 A1* | 6/2019 | Ironmonger | ............ | A63F 13/24 |
| 2022/0182703 A1* | 6/2022 | Lee | ........................ | G08C 17/02 |

* cited by examiner

*Primary Examiner* — Prabodh M Dharia
(74) *Attorney, Agent, or Firm* — Hanley, Flight & Zimmerman, LLC

(57) ABSTRACT

Methods and apparatus for adaptive keyboard scanning are disclosed. A disclosed example apparatus to adaptively control operation of a keyboard includes at least one memory, instructions, and processor circuitry. The processor circuitry is to determine whether to operate the keyboard in a first mode or in a second mode different from the first mode, the first mode corresponding to a first number of keys, the second mode corresponding to a second number of keys less than the first number of keys, and set the keyboard to operate in the first mode or the second mode based on the determination.

30 Claims, 12 Drawing Sheets

FIG. 4

METHODS AND APPARATUS FOR ADAPTIVE KEYBOARD SCANNING

FIELD OF THE DISCLOSURE

This disclosure relates generally to computing hardware and, more particularly, to methods and apparatus for adaptive keyboard scanning.

BACKGROUND

Generally, keyboards have remained prolific peripherals for computing tasks. Particularly, keyboards are implemented as input devices communicatively coupled to computing devices, such as personal computers (PCs), tablets, etc., for a wide variety of computing tasks including productivity, gaming, work, etc. Typically, keyboards include keys (e.g., key switches) physically arranged in rows and columns thereon such that the keys are scanned for actuation/presses along the rows and columns.

BRIEF DESCRIPTION OF THE DRAWINGS

FIG. 4 illustrates an example scan matrix corresponding to a first example mode of the example adaptive key scanning architecture of FIG. 2 and/or the example adaptive key analyzer of FIG. 3.

Figure 1:
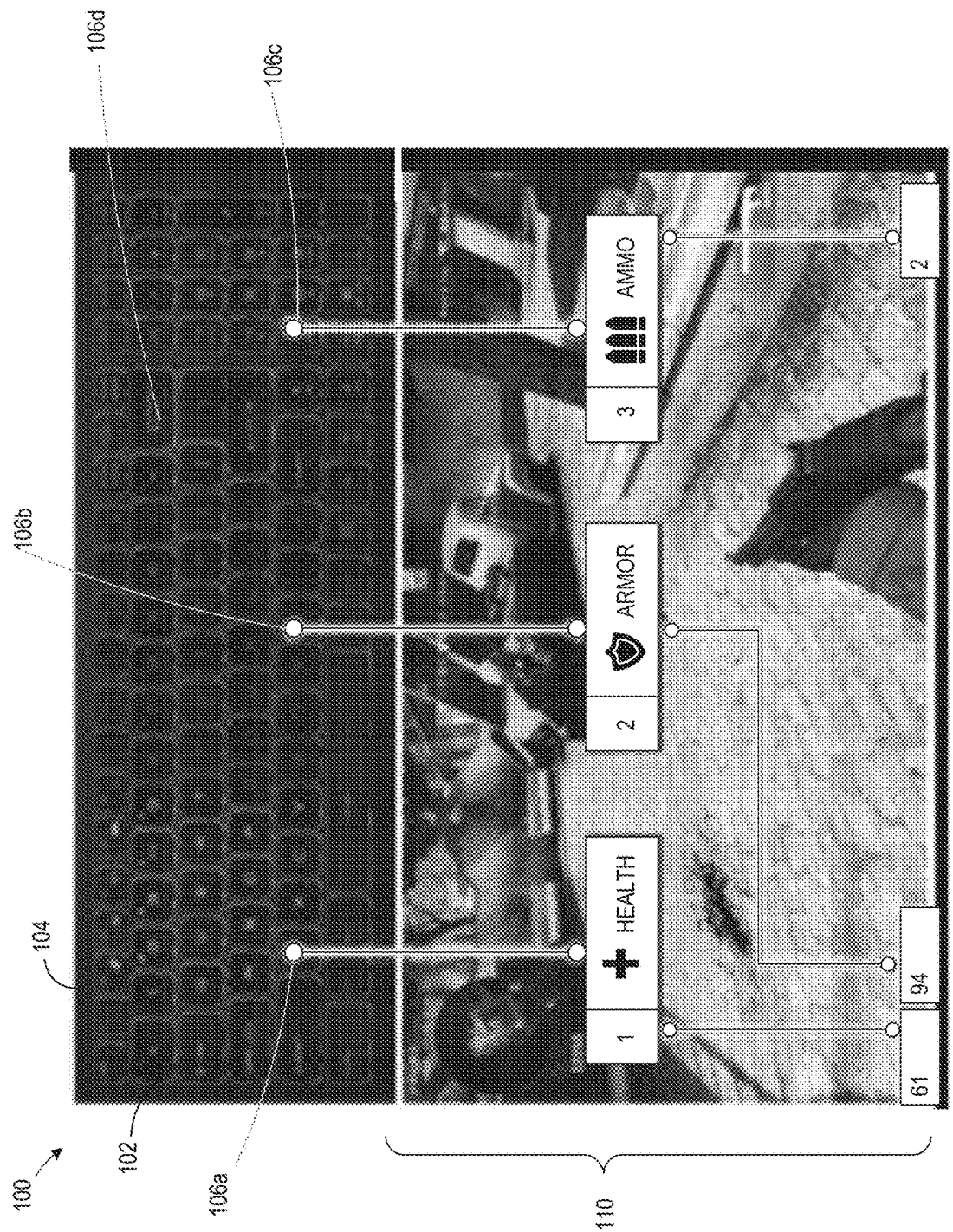
FIG. 1 illustrates an example keyboard in which examples disclosed herein can be implemented.

In general, the same reference numbers will be used throughout the drawing(s) and accompanying written description to refer to the same or like parts. The figures are not to scale. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Methods and apparatus for adaptive keyboard scanning are disclosed. Generally, keyboards are commonly used as peripherals in personal computing. In particular, keyboards are often used with personal computers (PCs) for a wide variety of tasks, including productivity, gaming, work, etc. Typically, keyboards include keys (e.g., key switches) physically arranged in an array of rows and columns. The keys are scanned for actuation/pressing along the rows and columns thereof with scan cycles.

Examples disclosed herein can effectively reduce latency of a keyboard or other appropriate input device. Further, examples disclosed herein can enable reduced power consumption. Examples disclosed herein can also enable a faster refresh rate than known keyboards by efficiently scanning designated and/or selected keys in different modes (e.g., different software modes). Examples disclosed herein can also reduce a number of "no-scan" keys analyzed for rows and columns of a keyboard, thereby reducing scan latency. Some examples disclosed herein can also reduce noise present in keyboard operation by adapting a scan pattern of a keyboard.

Examples disclosed herein determine whether to operate a keyboard in a first mode (e.g., a baseline mode, a baseline operational mode, a normal operating mode, etc.) or in a second mode (e.g., a performance mode, a gaming mode, etc.) different from the first mode. The first mode corresponds to a first number of keys, and the second mode corresponds to a second number of keys less than the first number of keys. In response to determining whether to operate the keyboard in the first mode or in the second mode, the keyboard is set to operate with the first number of keys in the first mode, or the keyboard is set to operate with the second number of keys in the second mode. In some examples, the first mode corresponds to a first number of active columns and rows that are scanned, and the second mode corresponds to a second number of active columns and rows that are scanned, where the first number of active columns and rows is greater than the second set of active columns and rows. Additionally or alternatively, the keyboard is operated with a first scan matrix in the first mode, or operated with a second scan matrix different from the first scan matrix in the second mode. The first scan matrix can have a greater number of rows and/or columns to be scanned than those associated with the second scan matrix, for example.

In some examples, the keyboard and/or associated hardware is operated with a higher scan rate, clock speed and/or refresh rate in the second mode compared to the first mode. In some examples, the keyboard is set to the second mode in response to a computing device communicatively coupled thereto being in a gaming or other high-performance computing mode. In some examples, rows and/or columns of the second mode are designated for scanning based on assigned or designated keys. The assigned keys may be associated with application-specific keys and/or user-defined keys (e.g., "hot" keys). Additionally or alternatively, a scan matrix is generated for the second mode. In some such examples, the scan matrix is generated based on the user-defined keys.

As used herein, the term "hub controller" refers to hardware, firmware and/or software that controls and/or directs operation of a keyboard or any other appropriate input device. Accordingly, the term "hub controller" can refer to a single or multiple devices, components and/or a systems. As used herein, the term "key" refers to a component, assembly and/or device that is utilized to register an input from a user utilizing a keyboard or other appropriate input device.

FIG. 1 illustrates an example keyboard 100 in which examples disclosed herein can be implemented. As can be seen in FIG. 1, the keyboard 100 includes a body 102 with a housing 104 that supports and positions keys 106 (hereinafter 106a, 106b, 106c, 106d, etc.). In this example, a screen display (e.g., a monitor display, a display, a screen, etc.) 110 depicts an application being executed/run on a computing device 208 (shown in FIG. 2) that is operatively and/or communicatively coupled to the example keyboard 100.

In operation, the keys 106 are scanned for user actuation while the keyboard 100 operated. In particular, the keys 106 are scanned with a scan matrix that maps rows and columns thereof. To this end, each of the keys 106 is scanned using the scan matrix to determine an actuation and/or pressing thereof. As a result, the keyboard 100 outputs a signal and/or indication corresponding to a pressed one of the keys 106 to the aforementioned computing device 208. In turn, software executing on the computing device 208 registers the pressed one of the keys 106, thereby causing the computing device 208 to display a change and/or indication on the display 110. In the illustrated example of FIG. 1, each of the keys 106 are scanned with the scan matrix. In other words, each of the keys 106 (along with their corresponding rows and columns) are continuously and/or periodically scanned for actuation and/or being pressed by the user even if some of the keys 106 are not utilized by the software executed on the computing device 208.

In the illustrated example, for different use and/or functionality, different ones of the keys 106 are assigned and/or designated for different controls of software being executed on the computing device 208. In this particular example, the keys 106a, 106b, 106c are designated keys for the operation of the software (e.g., hotkeys) while the key 106d is not utilized for the operation of the software and, thus, scanning thereof is not advantageous. In other words, the key 106d is not actively utilized by the software and, thus, pressing the key 106d does not affect and/or have an impact on operation or execution of the software. In known systems, the key 106d would still be scanned even though it is not used with the software. In contrast, examples disclosed herein can reduce (e.g., eliminate) scanning of the key 106d while the software is executed on the computing device 208, thereby enabling quicker overall refresh scanning of the keys 106 and a reduced power draw of the keyboard 100. As a result, examples disclosed herein can reduce latency of the keyboard 100, which can be highly advantageous during activities, such as computer/PC gaming or other performance-based applications.

While a keyboard is shown in FIG. 1, examples disclosed herein can be applied to any other appropriate input device and/or input architecture (e.g., a touchscreen display, etc.). Further, examples disclosed herein can be applied to any other appropriate use beyond that of personal computing.

Figure 2:
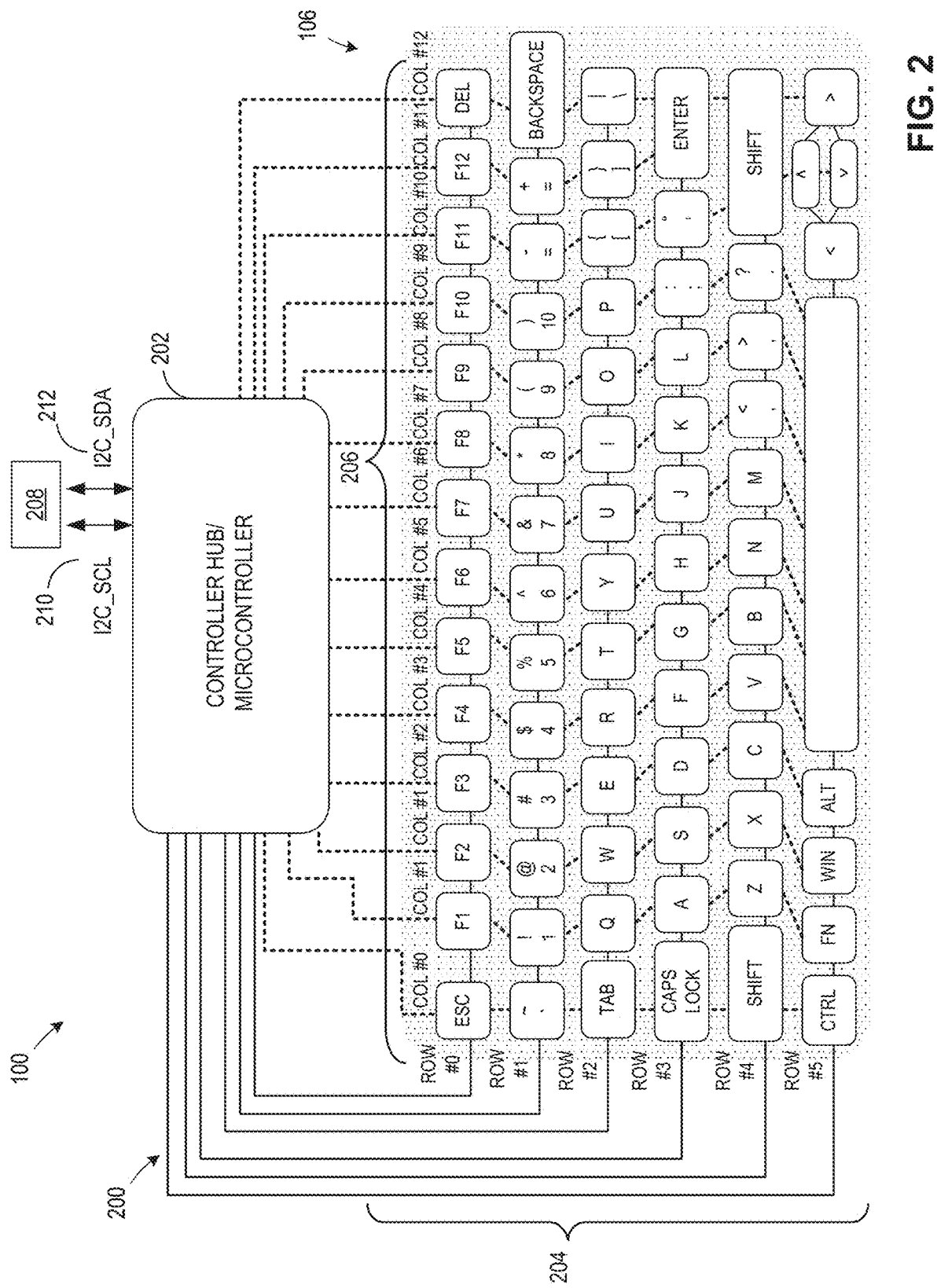
FIG. 2 illustrates an example adaptive key scanning architecture in accordance with teachings of this disclosure.

FIG. 2 illustrates an example adaptive key scanning architecture 200 in accordance with teachings of this disclosure. The key scanning architecture 200 of the illustrated example includes a hub controller (e.g., a sensor hub controller, a microcontroller, a key scan controller, an integrated sensor hub, an Intel™ sensor hub (ISH), etc.) 202 and the keys 106 arranged along rows 204 and columns 206. Further, in this example, each of the example keys 106 is communicatively coupled to the aforementioned computing device 208 via the hub controller 202 and communication bus lines 210, 212. The computing device 208 can be implemented as a desktop computer, laptop, tablet, mobile device, etc. However, any appropriate communication and/or data topology can be implemented instead.

In operation, the example hub controller 202 directs which ones of the keys 106 are to be scanned based on an operational mode of the keyboard 100. The operational mode may be set by the computing device 208, for example. In the illustrated example of FIG. 2, the hub controller 202 determines whether to operate the keyboard 100 in a first mode or in a second mode different from the first mode. The determination may be based on software (e.g., an application) being executed on the computing device 208. For example, a determination that the computing device 208 is running a game can cause the keyboard 100 to be set in a gaming/performance mode with a reduced number of keys to be scanned in comparison to that of a normal operating mode (e.g., a full key operating mode). In this example, the keyboard 100 is operated with (e.g., scans) a first number of keys in the first mode and, similarly, the keyboard 100 is operated with (e.g., scans) a second number of keys in the second mode less than the first number of keys.

In some examples, the second mode corresponds to a reduced number of the rows 204 and/or the columns 206 being scanned in comparison to the first mode. In particular, operation of the keyboard 100 in the second mode can correspond to a reduced number of the rows 204 and/or the columns 206 being scanned by the hub controller 202 (in comparison to the first mode), thereby enabling reduced latency for detecting actuation of the keys 106. Additionally or alternatively, ones of the keys 106 selected, assigned and/or designated for be scanned in the second mode are based on keys (e.g., "hot" keys) pertinent to execution of the software on the computing device 208 (e.g., "w," "a," "s," and "d" keys used for first-person shooting games, etc.) and, in turn, the hub controller 202 selects the pertinent ones of the rows 204 and ones of the columns 206 to scan with a scan matrix while operating the keyboard 100 in the second mode. In some examples, the selection of ones of the keys 106, the rows 204 and/or the columns 206 for operation of the keyboard 100 in the second mode is based on designated/assigned keys forwarded from software executed by the computing device 208 to the hub controller 202.

In some examples, the hub controller 202 utilizes a first scan matrix in the first mode of the keyboard 100 and a second scan matrix in the second mode of the keyboard 100 that is different from the first scan matrix. In some examples, the hub controller 202 sets itself and/or the computing device 208 to a higher refresh rate (e.g., key scanning refresh rate, a higher communication data rate, a higher sampling rate, etc.) and/or clock speed when the keyboard 100 is operated in the second mode. Additionally or alternatively, the determination of whether to operate the keyboard 100 in the first mode or the second mode is based on whether the computing device 208 is being operated in a gaming mode.

In some examples, the hub controller 202 is implemented as an Inter-Integrated Circuit (I²C) and/or universal serial bus (USB) port. In other examples, the hub controller 202 is implemented as a platform controller hub (PCH) controller that may operate with Enhanced Serial Peripheral Interface Bus (eSPI). Additionally or alternatively, the hub controller 202 is implemented as a system on a chip (SOC) device, for example.

Figure 3:
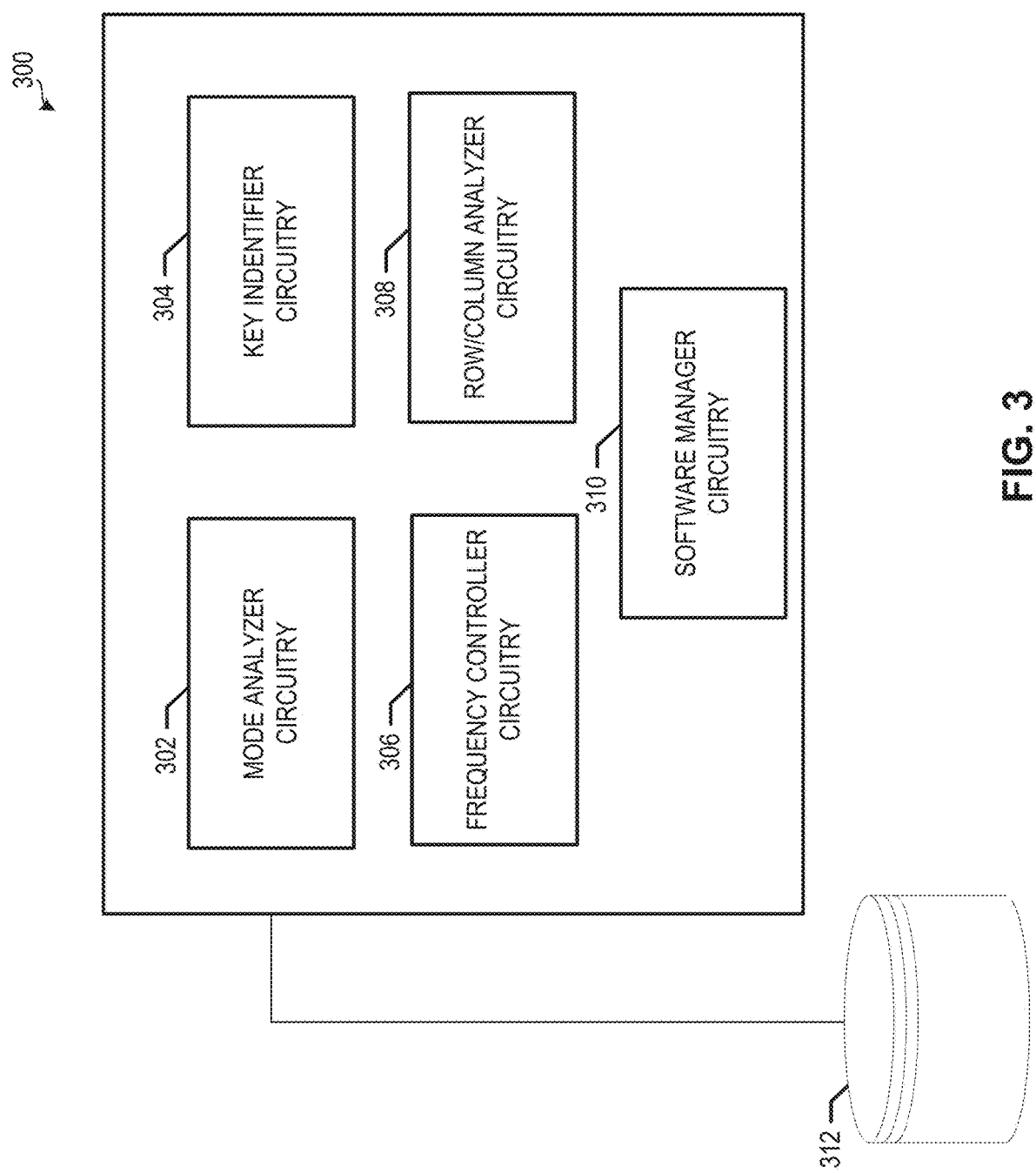
FIG. 3 is a block diagram of an example adaptive key analyzer that can be implemented in examples disclosed herein.

FIG. 3 is a block diagram of an example adaptive key analyzer 300 to adapt scanning and/or refresh operations of the example keyboard 100 and/or the example adaptive key scanning architecture 200 of FIG. 2. The adaptive key analyzer 300 of FIG. 3 may be instantiated (e.g., creating an instance of, bring into being for any length of time, materialize, implement, etc.) by processor circuitry such as a central processing unit executing instructions. Additionally or alternatively, the example adaptive key analyzer 300 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by one or more virtual machines and/or containers executing on the microprocessor.

The example adaptive key analyzer 300 includes example mode analyzer circuitry 302, example key identifier circuitry 304, example frequency controller circuitry 306, and example row/column analyzer circuitry 308. In some examples, an example software manager circuitry 310 is implemented to interface with and/or communicate with the computing device 208 of FIG. 2. Additionally or alternatively, a data storage 312 is implemented to store configuration information, drivers, key data, scan matrices, key data pertaining to software/applications, key bindings, key mappings, etc. The example adaptive key analyzer 300 can be implemented in the keyboard 100, the hub controller 202 and/or the computing device 208 of FIGS. 1 and 2.

The mode analyzer 302 of the illustrated example determines whether to operate the keyboard 100 and/or the hub controller 202 in a first mode or in a second mode. In this example, the first mode corresponds to a first number of keys to be scanned and the second mode corresponds to a second number of keys to be scanned, which is less than the first number of keys to be scanned. In some examples, the computing device 208 being set to a gaming mode causes the keyboard 100 to operate in the second mode.

The example key identifier circuitry 304 determines, designates, assigns and/or selects ones of the keys 106 to be operated (e.g., scanned) in the second mode of the keyboard 100. For example, the ones of keys 106, as well as their respective rows and columns, are selected based on software being executed on the computing device 208. In some examples, the selected ones of the keys 106 for the second mode have at least some overlap with ones of the keys 106 corresponding to the first mode. Additionally or alternatively, ones of the keys 106 pertaining to the second mode do not overlap with ones of the keys 106 pertaining to the first mode.

In some examples, the frequency controller circuitry 306 is implemented to vary and/or control a refresh rate and/or clock speed of the keyboard 100 and/or the hub controller 202. In some such examples, the refresh rate and/or the clock speed is varied based on whether the keyboard 100 is being operated in the first mode or the second mode. Additionally or alternatively, the frequency controller circuitry 306 directs a change (e.g., an increase) in a refresh rate and/or clock speed of communication hardware of the computing device 208 communicatively coupled to the keyboard 100.

According to examples disclosed herein, the example row/column analyzer circuitry 308 can be implemented to determine which ones of the rows and/or the columns are to be scanned (e.g., in the second mode of the keyboard 100) in the second mode. This determination may be based on designated, assigned and/or selected keys of the software being executed on the computing device 208. Particularly, the rows and columns to be utilized for a scan matrix may be determined based on utilized keys (e.g., "hot" keys) of the software being executed on the computing device 208. In some examples, the row/analyzer circuitry 308 generates a scan matrix (e.g., for operation of the keyboard 100 in the second mode).

In some examples, the example software manager circuitry 310 is utilized to manage and/or coordinate data corresponding to the keyboard 100 with the computing device 208. For example, the software manager circuitry 310 can control communication of the keyboard 100 and/or the hub controller 202 with the computing device 208. Additionally or alternatively, the example software manager circuitry 310 can direct control of the computing device 208. In a particular example, the software manager circuitry 310 facilitates communication between the hub controller 202 and the computing device 208 (e.g., the software manager circuitry 310 forwards an operating mode of the computing device 208 and/or the software being executed on the computing device 208 to the hub controller 202).

While first and second modes of operation of the keyboard 100 are described in examples disclosed herein, any appropriate number (e.g., three, five, ten, fifty, one hundred, etc.) of operational modes and/or scan matrices can be implemented instead. For example, the keyboard 100 can additionally be operated in a third mode that corresponds to different ones of the keys 106 and/or associated rows/columns from those of the second mode. In some such examples, the first mode can correspond to scanning an entirety of the keys 106.

Figure 4:
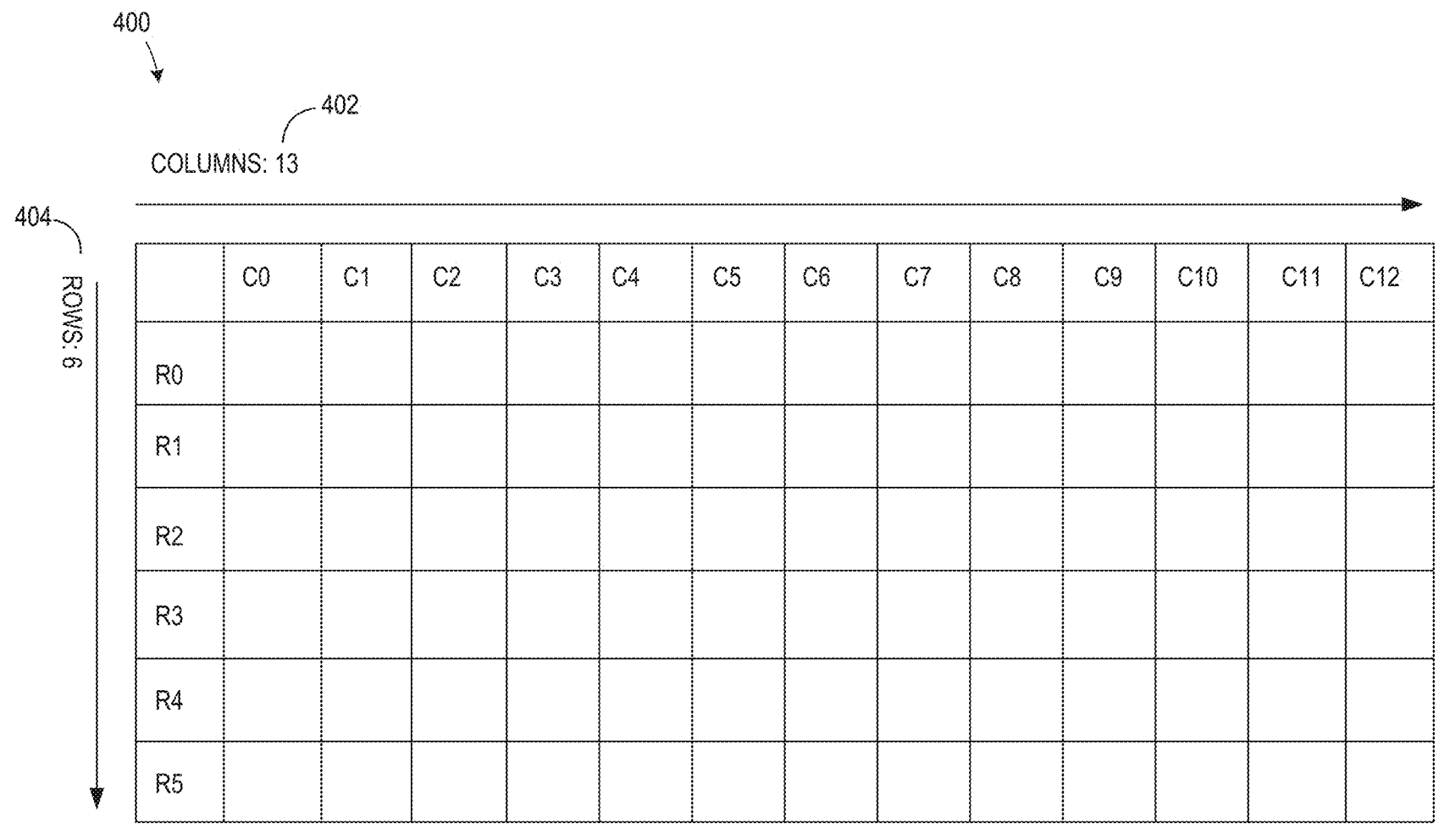

FIG. 4 illustrates an example scan matrix 400 corresponding to the first mode of the example adaptive key scanning architecture 200 of FIG. 2 and/or the example adaptive key analyzer 300 of FIG. 3. As can be seen in the illustrated example of FIG. 4, the scan matrix 400 corresponds to columns 402 and rows 404, all of which are scanned in the first mode. In other words, the example scan matrix 400 corresponds to a mode in which all the keys 106 and their associated rows/columns are scanned.

Figure 5:
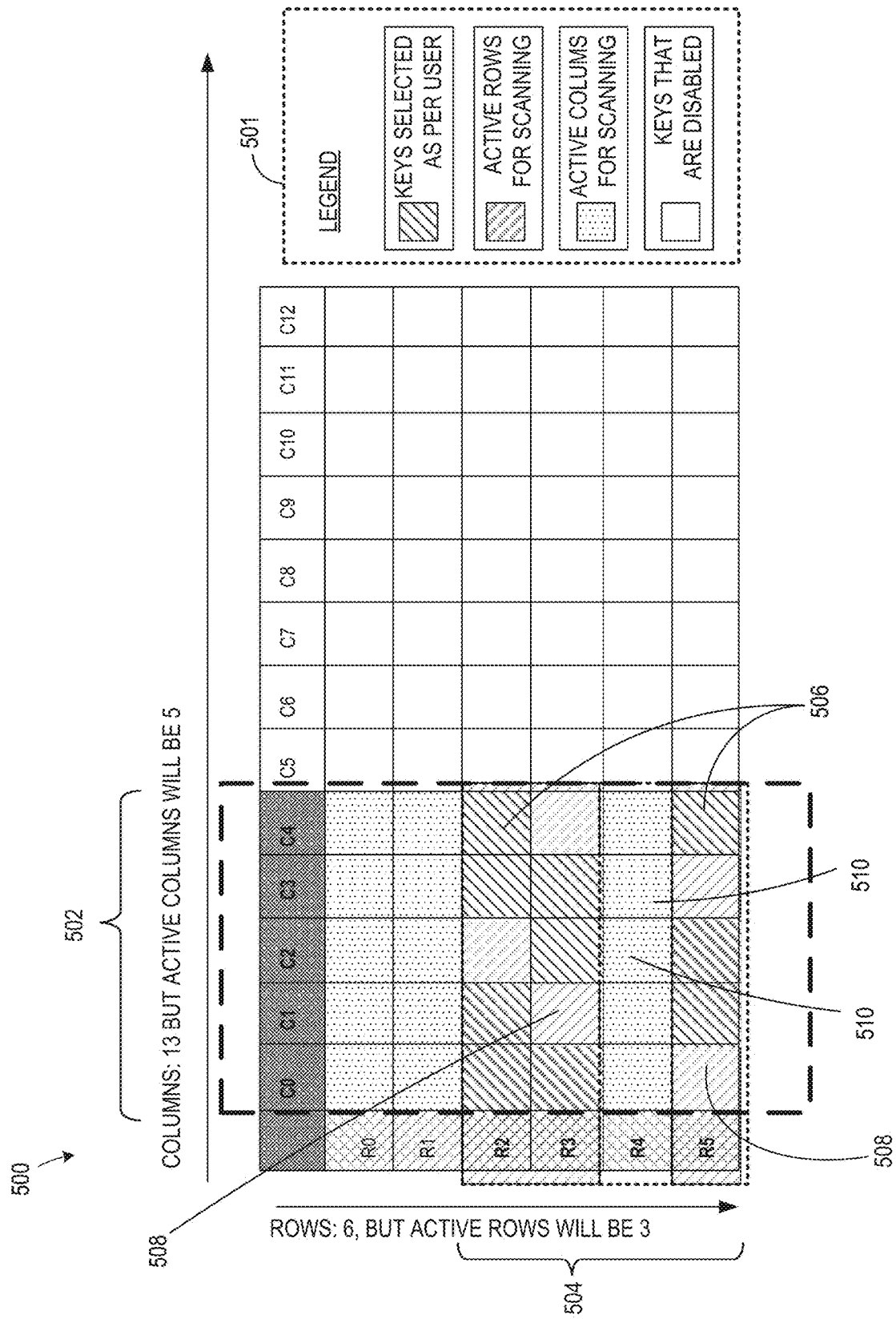
FIG. 5 illustrates another example scan matrix corresponding to a second example mode of the example adaptive key scanning architecture of FIG. 2 and/or the example adaptive key analyzer of FIG. 3.

FIG. 5 illustrates another example scan matrix 500 corresponding to the second mode (e.g., the advanced mode, the gaming mode, etc.) of the example adaptive key scanning architecture 200 of FIG. 2 and/or the example adaptive key analyzer 300 of FIG. 3. In the illustrated view of FIG. 5, a legend 501 depicts key assignments and/or designations. In contrast to the example of FIG. 4, select columns 502 and rows 504 are scanned with the example scan matrix 500. In other words, the scan matrix 500 includes fewer of the keys 106 to be scanned in comparison to the scan matrix 400. In this example, first keys 506 relate to keys selected by a user while second keys 508 correspond active rows for scanning. Further, third keys 510 correspond to active columns for scanning. In this particular example, some of the keys 106 associated with the columns 502 and the rows 504 are still not assigned and/designated for use with the software executed by the computing device 208. In this example, rows and/or columns of the un-assigned ones of the keys 106 are not scanned. As a result, a reduced number of the keys 106 are scanned in comparison to the scan matrix 400 shown in FIG. 4.

Figure 6:
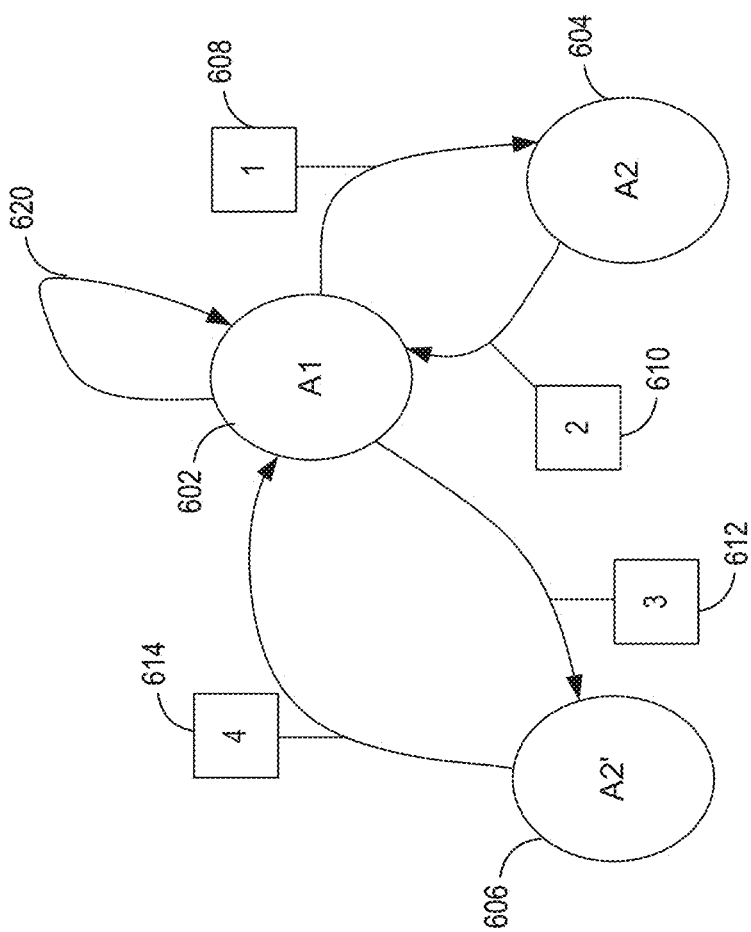
FIG. 6 depicts example mode management that can be implemented in examples disclosed herein.

FIG. 6 depicts example mode management that can be implemented in examples disclosed herein. According to the illustrated example of FIG. 6, operation of the keyboard is varied between states 602, 604, 606, which are labeled as "A1," "A2," and "A2'," respectively. In particular, the example states 602, 604, 606 represent different operating modes (e.g., key scanning operation modes) of the keyboard 100.

In this example, at step 608, the keyboard 100 operates in a legacy and/or full key operational mode (e.g., the first mode). In particular, the keyboard 100 is operated in a normal operation mode and pressing one of the keys 106 triggers a response communicated to the computing device 208. In this mode, all of the keys 106 are part of a debounce matrix. Further, firmware of the keyboard 100 and/or the computing device 208 polls the keys 106 for ones of the keys 106 that are pressed and/or actuated by a user. At the step 608, all of the keys 106 are scanned while a wait debounce is implemented (e.g., for accidental key presses). During this mode, when one of the keys 106 is pressed, a corresponding row and column is registered by the hub controller 202 and/or the computing device 208.

At step 610, the keyboard 100 is in the legacy mode as long as no further keystrokes/actuations of the keys 106 are detected. In other words, the example keyboard 100 defaults to the aforementioned legacy mode.

At step 612, the keyboard 100 operates in an advanced mode (e.g., the second mode, a gaming mode, a creativity mode, etc.). In some examples, [the] a function key (Fn) is actuated by the user to place the keyboard 100 in the advanced mode. For example, the keyboard 100 can be operated in the advanced mode through firmware, a driver of the keyboard 100, etc.

According to some examples disclosed herein, in regard to the advanced mode, the user can enter designated and/or assigned keys (e.g., "hot" keys) via a user interface (UI) of software being run on the computing device 208, for example. In some examples, a look up table (LUT) with entries pertaining to selected/designated keys is generated. In particular, LUTs may include associated scan codes of ones of the keys 106. Additionally or alternatively, a matrix (e.g., a scan matrix) based on a user preference of a number of the keys 106 is utilized.

In the advanced mode of step 612, firmware polls can be employed for specific ones of the keys 106 pressed. In this mode, specific rows and columns associated with the keys 106 are scanned. Further, wait debounce can be implemented to mitigate accidental key presses. Moreover, a scan matrix is rescanned periodically, for example. In this example, a row and a column of a specific one of the keys 106 is identified during actuation/pressing thereof. In some examples, a scan code of a key pressed is forwarded and/or presented to an operating system (OS) of the computing device 208.

In some examples, during advanced operation of the keyboard 100, the keys 106 may be assigned. For example, such assignments can include "w" as an "up arrow key," "a" as a "left arrow key," "s" as a "down arrow key," "d" as a "right arrow key" and "space" as a "fire/shoot" key. In such an example, a 4×3 scan matrix can be employed and/or generated with an associated LUT and scan code(s) for the key(s) 106. In such examples, the remaining ones of the keys 106 can be ignored and/or disabled. In this example, the keyboard 100 is operated in the advanced mode until the user changes the mode of the keyboard 100 to the aforementioned legacy/normal operation mode.

At step 614, a mode transition (e.g., a changeover) is employed. For example, the function key, hardware, firmware, a driver and/or an OS is utilized for a mode change from the aforementioned advanced mode to the legacy mode.

At step 620, in this example, none of the keys 106 are pressed and the keyboard 100 operates in a low-power or power-saving state.

The example of FIG. 6 is only an example and any appropriate control hierarchy and/or scheme of the keyboard 100 can be implemented instead. Moreover, examples disclosed herein in any of the figures can be implemented in any appropriate type of input device such as, but not limited to, a mouse, a keypad, a trackball, etc.

While an example manner of implementing the adaptive key analyzer 300 of FIG. 3 is illustrated in FIG. 3, one or more of the elements, processes, and/or devices illustrated in FIG. 3 may be combined, divided, re-arranged, omitted, eliminated, and/or implemented in any other way. Further, the example mode analyzer circuitry 302, the example key identifier circuitry 304, the example frequency controller circuitry 306, the example row/column analyzer circuitry 308, the example software manager circuitry 310, and/or, more generally, the example adaptive key analyzer 300 of FIG. 3, may be implemented by hardware alone or by hardware in combination with software and/or firmware. Thus, for example, any of the example mode analyzer circuitry 302, the example key identifier circuitry 304, the example frequency controller circuitry 306, the example row/column analyzer circuitry 308, the example software manager circuitry 310, and/or, more generally, the example adaptive key analyzer 300, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example adaptive key analyzer 300 of FIG. 3 may include one or more elements, processes, and/or devices in addition to, or instead of, those illustrated in FIG. 3, and/or may include more than one of any or all of the illustrated elements, processes and devices.

Figure 7:
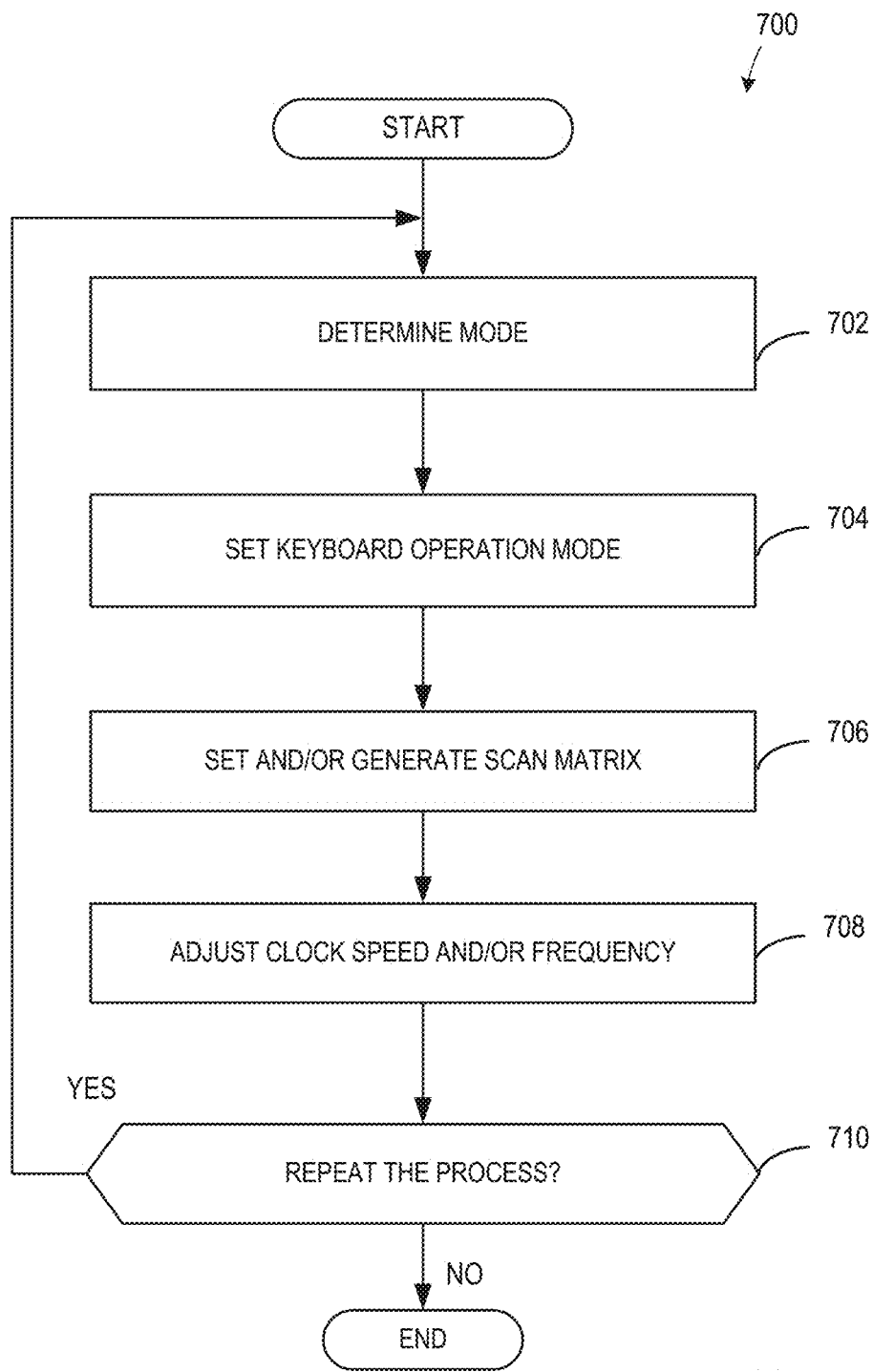
FIGS. 7 and 8 are flowcharts representative of example machine readable instructions and/or example operations that may be executed by example processor circuitry to implement the example adaptive key scanning architecture of FIG. 2 and/or the example adaptive key analyzer of FIG. 3.
Figure 8:
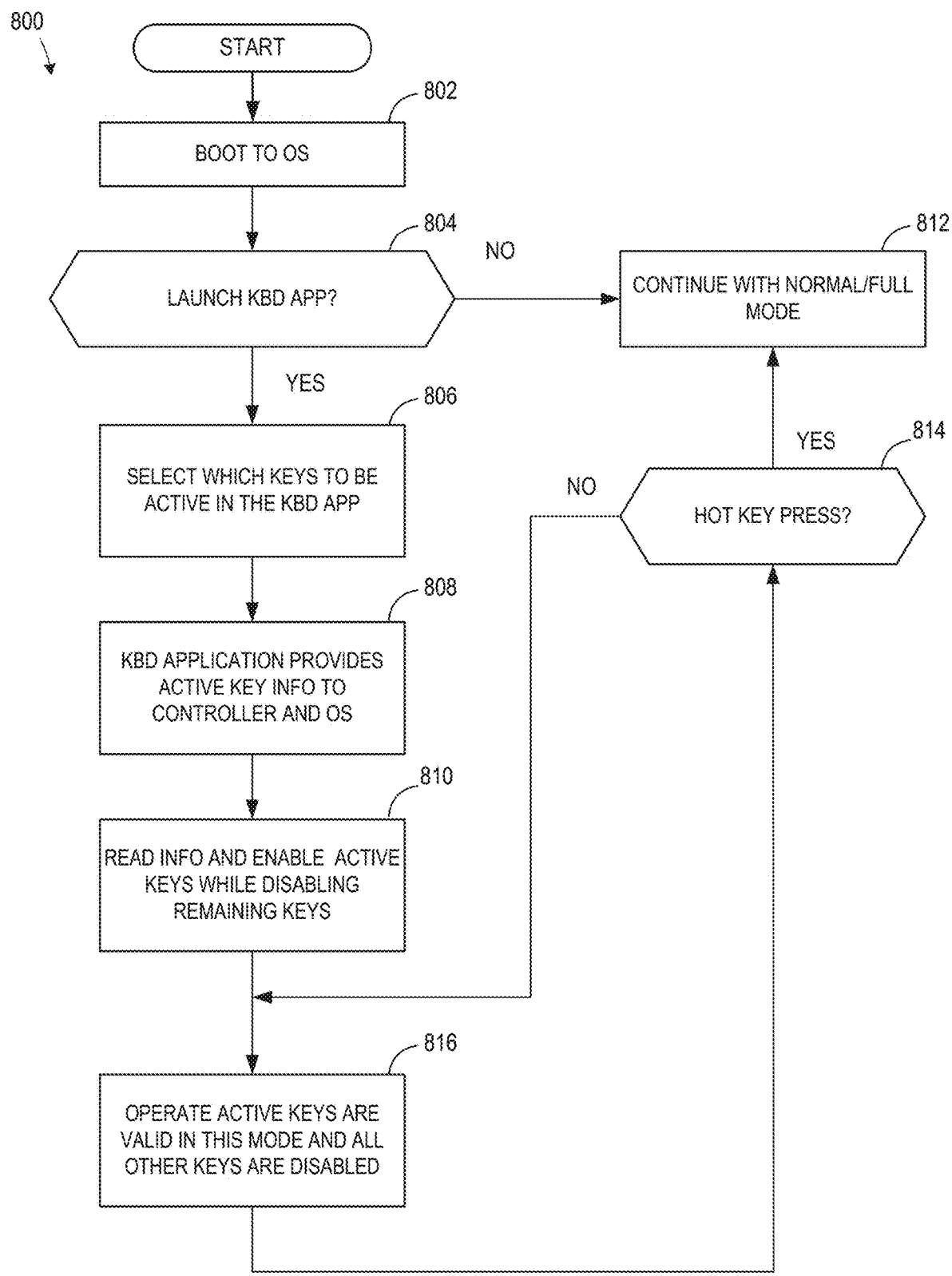

Flowcharts representative of example hardware logic circuitry, machine readable instructions, hardware implemented state machines, and/or any combination thereof for implementing the adaptive key analyzer 300 of FIG. 3 are shown in FIGS. 7 and 8. The machine readable instructions may be one or more executable programs or portion(s) of an executable program for execution by processor circuitry, such as the processor circuitry 912 shown in the example processor platform 900 discussed below in connection with FIG. 9 and/or the example processor circuitry discussed below in connection with FIGS. 10 and/or 11. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 7 and 8, many other methods of implementing the example adaptive key analyzer 300 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 7 and 8 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 7 is a flowchart representative of example machine readable instructions and/or example operations 700 that may be executed and/or instantiated by processor circuitry to adaptively control an operation, power consumption and/or latency of the keyboard 100. The machine readable instructions and/or the operations 700 of FIG. 7 begin at block 702, at which the example mode analyzer circuitry 302 determines a mode to operate the keyboard 100 or a mode in which the computing device 208 is operating. In this example, the mode analyzer circuitry 302 determines whether to operate the keyboard 100, the hub controller 202 and/or ones of the keys 106 in the first mode or the second mode.

At block 704, the mode analyzer circuitry 302 of the illustrated example sets an operational mode of the keyboard 100. For example, the mode analyzer circuitry 302 determines whether the computing device 208 and/or software executing thereon is executing a game and/or operating in a gaming mode. Accordingly, if the computing device 208 and/or the software is executing the game and/or operating in a gaming mode, the keyboard 100 is operated in the second mode with reduced keys to scan than in the first mode, which is associated with a normal operating use of the keyboard 100.

At block 706, the row/column analyzer circuitry 308 sets and/or generates at least one scan matrix that directs operation of the keyboard 100 in the determined one of the first or second modes. In the illustrated example of FIG. 7, the row/column analyzer circuitry 308 selects a first scan matrix when the first mode of the keyboard 100 is selected and/or the keyboard is operating in the first mode. Likewise, the example row/column analyzer circuitry 308 selects a second scan matrix when the second mode of the keyboard 100 is selected and/or the keyboard 100 is operated in the second mode. Additionally or alternatively, the second scan matrix is generated based on the selected and/or designated ones of the keys 106 pertaining to the second mode of the keyboard 100.

At block 708, in some examples, the frequency controller circuitry 306 adjusts the clock speed and/or refresh rate of the keyboard 100, the controller hub 202 and/or communication hardware/devices of the computing device 208. As a result, designated/selected ones of the keys 106 of the keyboard 100 can be scanned at a higher refresh rate than in the first mode, for example.

At block 710, the mode analyzer 302 determines whether to repeat the process. If the process is to be repeated (block 710), control of the process returns to block 702. Otherwise, the process ends. This determination may be based on whether the keyboard 100 has switched operational modes (e.g., the keyboard 100 has transitioned to a normal operation mode from a gaming mode) and/or whether the keyboard 100 is to be further utilized.

FIG. 8 is a flowchart representative of example machine readable instructions and/or example operations 800 that may be executed and/or instantiated by processor circuitry to adaptively control an operation, power consumption and/or latency of the keyboard 100. The machine readable instructions and/or the operations 800 of FIG. 8 begin at block 802 where, in some examples, the example software manager circuitry 310 controls and/or directs an OS of the computing device 208 to boot.

At block 804, in this example, it is determined by the software manager circuitry 310 of the illustrated example whether to launch the keyboard application. If the keyboard application is to be launched (block 804), control of the process proceeds to block 806. Otherwise, control of the process proceeds to block 812. In this example, launching the keyboard application triggers and/or causes the keyboard 100 to operate in the second mode (e.g., with a reduced set of active ones of the keys 106 for scanning).

At block 806, the key identifier circuitry 304 and/or the row/analyzer circuitry 308 of the illustrated example select ones of the keys 106 to be active and/or scanned. In some examples, the ones of the keys 106 are selected based on user input (e.g., user-defined "hot" keys and/or designated keys).

At block 808, the example software manager circuitry 310 directs the keyboard application executed by the computing device 208 and/or the keyboard 100 to provide active key information (e.g., at least one scan matrix of active ones of the keys 106) to the hub controller 202, the keyboard 100 and/or the aforementioned OS of the computing device 208.

At block 810, in the illustrated example of FIG. 8, the mode analyzer circuitry 302 and/or the key identifier circuitry 304 causes the hub controller 202 (and/or a driver of the hub controller 202) to read driver information and/or a driver of the keyboard 100 and, in turn, enables only active ones of the keys 106 to be scanned in the second mode while remaining ones of the keys 106 are not scanned (e.g., disabled). In this example, the mode analyzer circuitry 302 of the illustrated example causes the hub controller 202 to operate the active ones of the keys 106 while disabling and/or not scanning ones of the inactive keys 106. In particular, columns and rows corresponding to the active ones of the keys 106 are actively scanned.

In some examples, once the keyboard 100 is set to the second mode, an acknowledgement and/or confirmation is provided to the aforementioned application (e.g., from the hub controller 202). In some such examples, the application indicates to the user that the keyboard 100 is an advanced or performance mode once the application receives the acknowledgement and/or confirmation.

At block 812, the example mode analyzer circuitry 302 causes the keyboard 100 to be operated in a normal/full mode (e.g., the first mode) in which all of the keys 106 are continuously and/or periodically scanned.

At block 814, it is determined by the mode analyzer circuitry 302 as to whether a designated/assigned key (e.g., "hot" key) has been pressed. If the key has been pressed, control of the process proceeds to block 812. Otherwise, control of the process proceeds to block 816.

Figure 9:
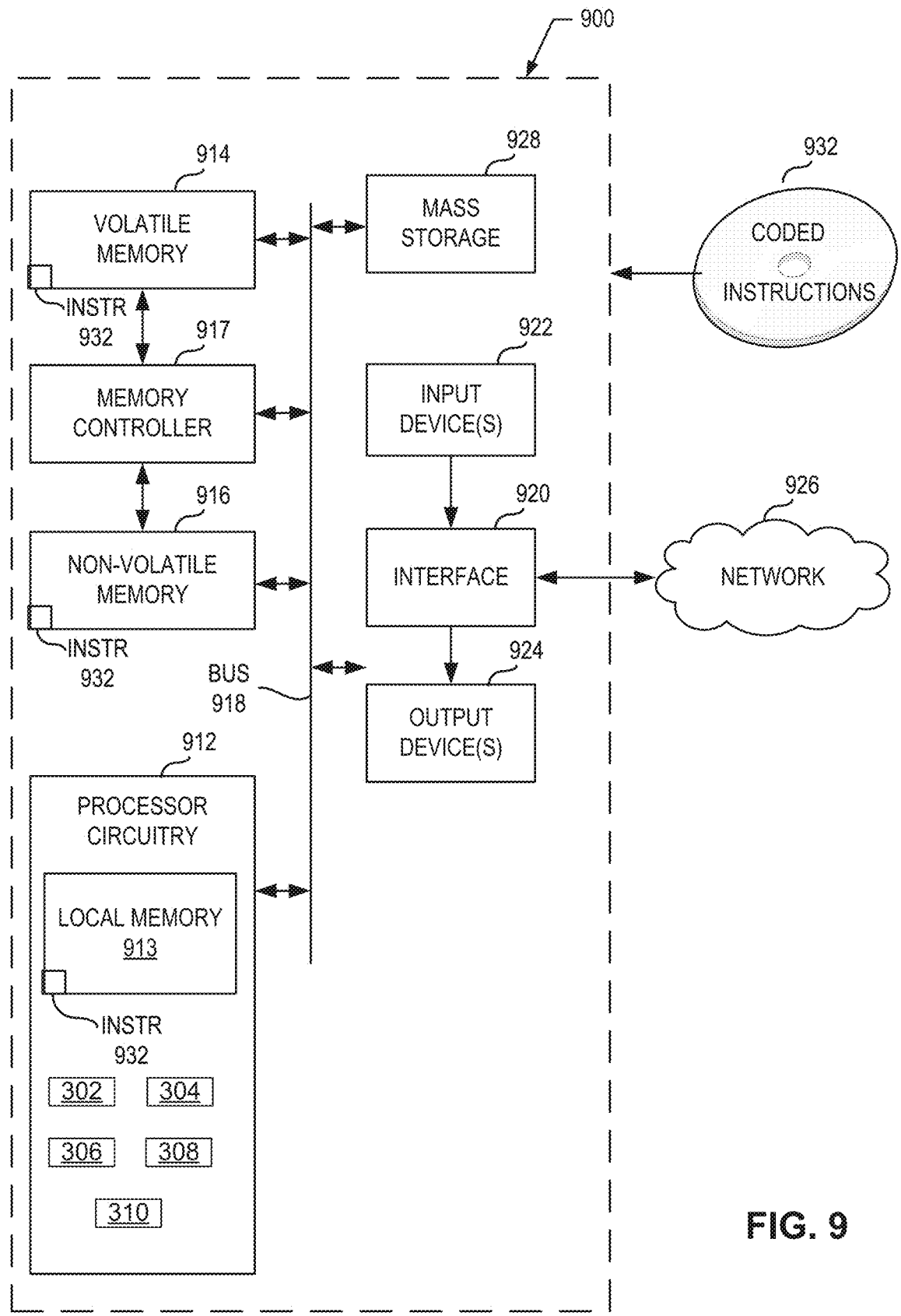
FIG. 9 is a block diagram of an example processing platform including processor circuitry structured to execute the example machine readable instructions and/or the example operations of FIGS. 7 and 8 to implement the example adaptive key scanning architecture of FIG. 2 and/or the example adaptive key analyzer of FIG. 3.

FIG. 9 is a block diagram of an example processor platform 900 structured to execute and/or instantiate the machine readable instructions and/or the operations of FIGS. 7 and 8 to implement the adaptive key analyzer 300 of FIG. 3. The processor platform 900 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs, microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 implements the example mode analyzer circuitry 302, the example key identifier circuitry 304, the example frequency controller circuitry 306, the example row/column analyzer 308, and the example software manager circuitry 310.

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permit(s) a user to enter data and/or commands into the processor circuitry 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuitry 920 of the illustrated example. The output device(s) 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 932, which may be implemented by the machine readable instructions of FIGS. 7 and 8, may be stored in the mass storage device 928, in the volatile memory 914, in the non-volatile memory 916, and/or on a removable non-transitory computer readable storage medium such as a CD or DVD.

Figure 10:
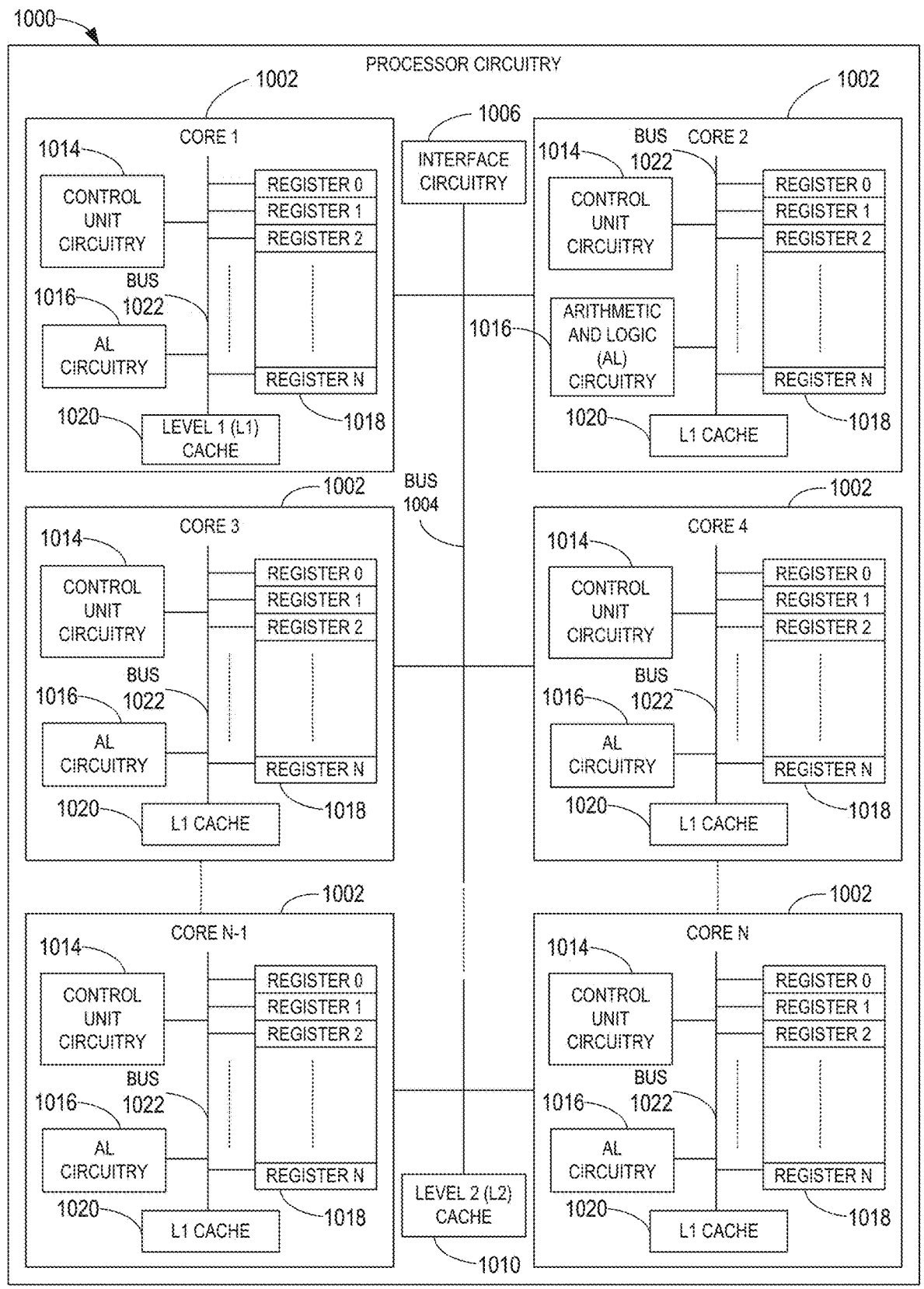
FIG. 10 is a block diagram of an example implementation of the processor circuitry of FIG. 9.

FIG. 10 is a block diagram of an example implementation of the processor circuitry 912 of FIG. 9. In this example, the processor circuitry 912 of FIG. 9 is implemented by a general purpose microprocessor 1000. The general purpose microprocessor circuitry 1000 executes some or all of the machine readable instructions of the flowcharts of FIGS. 7 and 8 to effectively instantiate the circuitry of FIG. 3 as logic circuits to perform the operations corresponding to those machine readable instructions. In some such examples, the circuitry of FIG. 3 is instantiated by the hardware circuits of the microprocessor 1000 in combination with the instructions. For example, the microprocessor 1000 may implement multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine readable instructions and/or operations represented by the flowcharts of FIGS. 7 and 8.

The cores 1002 may communicate by a first example bus 1004. In some examples, the first bus 1004 may implement a communication bus to effectuate communication associated with one(s) of the cores 1002. For example, the first bus 1004 may implement at least one of an Inter-Integrated Circuit (I2C) bus, a Serial Peripheral Interface (SPI) bus, a PCI bus, or a PCIe bus. Additionally or alternatively, the first bus 1004 may implement any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2_ cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the L1 cache 1020, and a second example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating point operations. In yet other examples, the AL circuitry 1016 may include first AL circuitry that performs integer based operations and second AL circuitry that performs floating point operations. In some examples, the AL circuitry 1016 may be referred to as an Arithmetic Logic Unit (ALU). The registers 1018 are semiconductor-based structures to store data and/or instructions such as results of one or more of the operations performed by the AL circuitry 1016 of the corresponding core 1002. For example, the registers 1018 may include vector register(s), SIMD register(s), general purpose register (s), flag register(s), segment register(s), machine specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure including distributed throughout the core 1002 to shorten access time. The second bus 1022 may implement at least one of an I2C bus, a SPI bus, a PCI bus, or a PCIe bus Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 11:
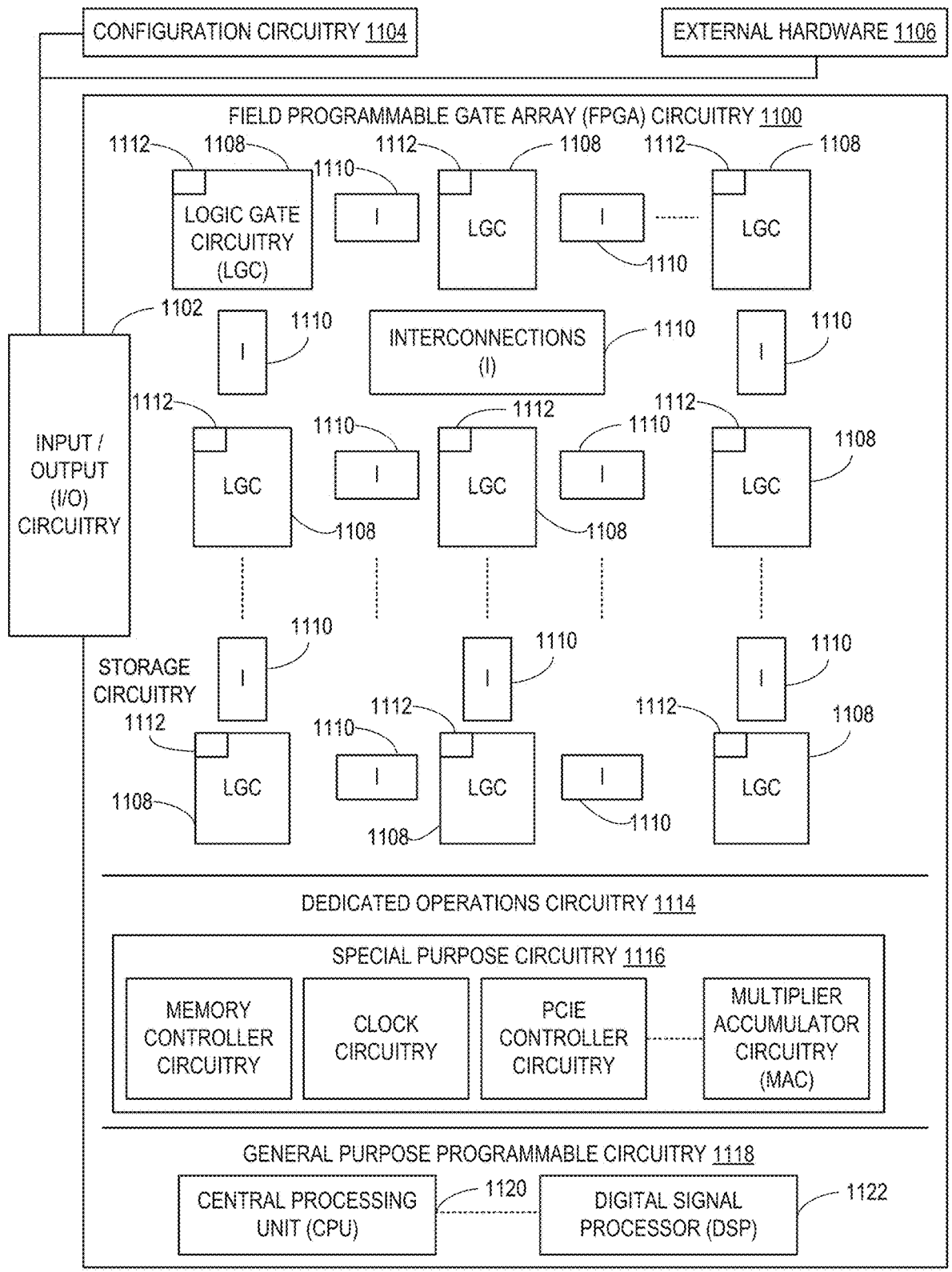
FIG. 11 is a block diagram of another example implementation of the processor circuitry of FIG. 9.

FIG. 11 is a block diagram of another example implementation of the processor circuitry 912 of FIG. 9. In this example, the processor circuitry 912 is implemented by FPGA circuitry 1100. The FPGA circuitry 1100 can be used, for example, to perform operations that could otherwise be performed by the example microprocessor 1000 of FIG. 10 executing corresponding machine readable instructions. However, once configured, the FPGA circuitry 1100 instantiates the machine readable instructions in hardware and, thus, can often execute the operations faster than they could be performed by a general purpose microprocessor executing the corresponding software.

More specifically, in contrast to the microprocessor 1000 of FIG. 10 described above (which is a general purpose device that may be programmed to execute some or all of the machine readable instructions represented by the flowcharts of FIGS. 7 and 8 but whose interconnections and logic circuitry are fixed once fabricated), the FPGA circuitry 1100 of the example of FIG. 11 includes interconnections and logic circuitry that may be configured and/or interconnected in different ways after fabrication to instantiate, for example, some or all of the machine readable instructions represented by the flowcharts of FIGS. 7 and 8. In particular, the FPGA 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the software represented by the flowcharts of FIGS. 7 and 8. As such, the FPGA circuitry 1100 may be structured to effectively instantiate some or all of the machine readable instructions of the flowcharts of FIGS. 7 and 8 as dedicated logic circuits to perform the operations corresponding to those software instructions in a dedicated manner analogous to an ASIC. Therefore, the FPGA circuitry 1100 may perform the operations corresponding to the some or all of the machine readable instructions of FIGS. 7 and 8 faster than the general purpose microprocessor can execute the same.

In the example of FIG. 11, the FPGA circuitry 1100 is structured to be programmed (and/or reprogrammed one or more times) by an end user by a hardware description language (HDL) such as Verilog. The FPGA circuitry 1100 of FIG. 11, includes example input/output (I/O) circuitry 1102 to obtain and/or output data to/from example configuration circuitry 1104 and/or external hardware (e.g., external hardware circuitry) 1106. For example, the configuration circuitry 1104 may implement interface circuitry that may obtain machine readable instructions to configure the FPGA circuitry 1100, or portion(s) thereof. In some such examples, the configuration circuitry 1104 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1106 may implement the microprocessor 1000 of FIG. 10. The FPGA circuitry 1100 also includes an array of example logic gate circuitry 1108, a plurality of example configurable interconnections 1110, and example storage circuitry 1112. The logic gate circuitry 1108 and interconnections 1110 are configurable to instantiate one or more operations that may correspond to at least some of the machine readable instructions of FIGS. 7 and 8 and/or other desired operations. The logic gate circuitry 1108 shown in FIG. 11 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations. The logic gate circuitry 1108 may include other electrical structures such as look-up tables (LUTs), registers (e.g., flip-flops or latches), multiplexers, etc.

The interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example Dedicated Operations Circuitry 1114. In this example, the Dedicated Operations Circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the processor circuitry 912 of FIG. 9, many other approaches are contemplated. For example, as mentioned above, modern FPGA circuitry may include an on-board CPU, such as one or more of the example CPU 1120 of FIG. 11. Therefore, the processor circuitry 912 of FIG. 9 may additionally be implemented by combining the example microprocessor 1000 of FIG. 10 and the example FPGA circuitry 1100 of FIG. 11. In some such hybrid examples, a first portion of the machine readable instructions represented by the flowcharts of FIGS. 7 and 8 may be executed by one or more of the cores 1002 of FIG. 10, a second portion of the machine readable instructions represented by the flowcharts of FIGS. 7 and 8 may be executed by the FPGA circuitry 1100 of FIG. 11, and/or a third portion of the machine readable instructions represented by the flowcharts of FIGS.

7 and 8 may be executed by an ASIC. It should be understood that some or all of the circuitry of FIG. 3 may, thus, be instantiated at the same or different times. Some or all of the circuitry may be instantiated, for example, in one or more threads executing concurrently and/or in series. Moreover, in some examples, some or all of the circuitry of FIG. 3 may be implemented within one or more virtual machines and/or containers executing on the microprocessor.

In some examples, the processor circuitry 912 of FIG. 9 may be in one or more packages. For example, the processor circuitry 1000 of FIG. 10 and/or the FPGA circuitry 1100 of FIG. 11 may be in one or more packages. In some examples, an XPU may be implemented by the processor circuitry 912 of FIG. 9, which may be in one or more packages. For example, the XPU may include a CPU in one package, a DSP in another package, a GPU in yet another package, and an FPGA in still yet another package.

Figure 12:
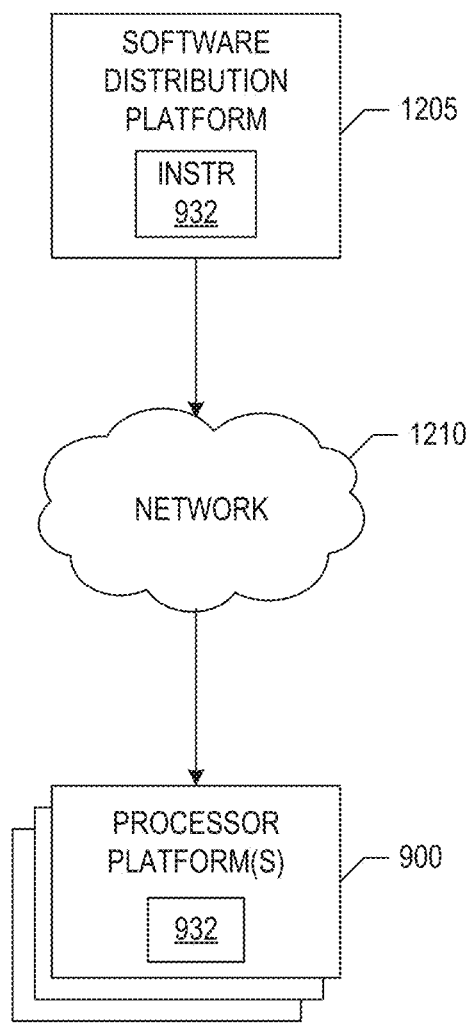
FIG. 12 is a block diagram of an example software distribution platform (e.g., one or more servers) to distribute software (e.g., software corresponding to the example machine readable instructions of FIGS. 7 and 8) to client devices associated with end users and/or consumers (e.g., for license, sale, and/or use), retailers (e.g., for sale, re-sale, license, and/or sub-license), and/or for original equipment manufacturers (OEMs) (e.g., for inclusion in products to be distributed to, for example, retailers and/or to other end users such as direct buy customers).

A block diagram illustrating an example software distribution platform 1205 to distribute software such as the example machine readable instructions 932 of FIG. 9 to hardware devices owned and/or operated by third parties is illustrated in FIG. 12. The example software distribution platform 1205 may be implemented by any computer server, data facility, cloud service, etc., capable of storing and transmitting software to other computing devices. The third parties may be customers of the entity owning and/or operating the software distribution platform 1205. For example, the entity that owns and/or operates the software distribution platform 1205 may be a developer, a seller, and/or a licensor of software such as the example machine readable instructions 932 of FIG. 9. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the machine readable instructions 932, which may correspond to the example machine readable instructions 700, 800 of FIGS. 7 and 8, as described above. The one or more servers of the example software distribution platform 1205 are in communication with a network 1210, which may correspond to any one or more of the Internet and/or any example network. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 932 from the software distribution platform 1205. For example, the software, which may correspond to the example machine readable instructions 932 of FIG. 9, may be downloaded to the example processor platform 900, which is to execute the machine readable instructions 932 to implement the adaptive key analyzer 300. In some example, one or more servers of the software distribution platform 1205 periodically offer, transmit, and/or force updates to the software (e.g., the example machine readable instructions 932 of FIG. 9) to ensure improvements, patches, updates, etc., are distributed and applied to the software at the end user devices.

Example methods, apparatus, systems, and articles of manufacture to adaptively scan keys/buttons/switches of a keyboard or other input device are disclosed herein. Further examples and combinations thereof include the following: Example 1 includes an apparatus to adaptively control operation of a keyboard, the apparatus comprising at least one memory, instructions, and processor circuitry to execute the instructions to determine whether to operate the keyboard in a first mode or in a second mode different from the first mode, the first mode corresponding to a first number of keys, the second mode corresponding to a second number of keys less than the first number of keys, and set the keyboard to operate in the first mode or the second mode based on the determination.

Example 2 includes the apparatus as defined in example 1, wherein the first mode corresponds to a first number of active columns and rows, and the second mode corresponds to a second number of active columns and rows, the first number of active columns and rows greater than the second set of active columns and rows.

Example 3 includes the apparatus as defined in any of examples 1, or 2 wherein the processor circuitry is to execute the instructions to operate the keyboard with a first scan matrix in the first mode, or operate the keyboard with a second scan matrix different from the first scan matrix in the second mode.

Example 4 includes the apparatus as defined in any of examples 1 to 3, wherein the processor circuitry is to execute the instructions to set a clock speed associated with the keyboard to a first clock speed when the keyboard is operating in the first mode, and a second clock speed when the keyboard is operating in the second mode, the second clock speed greater than the first clock speed.

Example 5 includes the apparatus as defined in any of examples 1 to 4, wherein the processor circuitry is to determine whether to operate the keyboard in the first mode or the second mode based on whether a computing device communicatively coupled to the keyboard is set to a gaming mode.

Example 6 includes the apparatus as defined in any of examples 1 to 5, wherein the processor circuitry is to select keys associated with the second mode based on designated keys corresponding to software executed on a computing device.

Example 7 includes the apparatus as defined in example 6, wherein the designated keys are set by a user of the software.

Example 8 includes the apparatus as defined in any of examples 1 to 7, wherein the processor circuitry is to execute the instructions to generate a scan matrix corresponding to the second mode.

Example 9 includes a keyboard comprising a housing, keys supported by the housing, ones of the keys associated with a respective row and a respective column, and a hub controller to set sampling of the keys in a first mode or in a second mode, the first mode corresponding to a first number of ones of the keys, the second mode corresponding to a second number of ones of the keys less than the first number of ones of the keys.

Example 10 includes the keyboard as defined in example 9, wherein the first mode corresponds to a first number of active columns and rows, and the second mode corresponds to a second number of active columns and rows, the first number of active columns and rows greater than the second set of active columns and rows.

Example 11 includes the keyboard as defined in any of examples 9 or 10, wherein the hub controller is to utilize a first scan matrix when the keyboard is operated in the first mode and utilize a second scan matrix when the keyboard is operated in the second mode.

Example 12 includes the keyboard as defined in example 11, wherein the second scan matrix is based on assigned keys set by a user of a computing device communicatively coupled to the keyboard.

Example 13 includes the keyboard as defined in any of examples 11 or 12, wherein the first scan matrix corresponds to a first sampling rate of the hub controller and the second scan matrix corresponds to a second sampling rate of the hub controller greater than the first sampling rate.

Example 14 includes the keyboard as defined in any of examples 9 to 13, wherein the hub controller is to determine an operational mode of software being executed on a computing device communicatively coupled to the keyboard.

Example 15 includes the keyboard as defined in example 14, wherein the operational mode corresponds to a baseline operational mode or a gaming mode.

Example 16 includes a non-transitory computer readable medium comprising instructions, which when executed, cause processor circuitry to determine whether to operate a keyboard in a first mode or in a second mode different from the first mode, the first mode corresponding to a first number of keys, the second mode corresponding to a second number of keys less than the first number of keys, and set, based on the determination, the keyboard to scan the first number of keys in the first mode, or scan the second number of keys in the second mode.

Example 17 includes the non-transitory computer readable medium as defined in example 16, wherein the first mode corresponds to a first number of active columns and rows, and the second mode corresponds to a second number of active columns and rows, the first number of active columns and rows greater than the second set of active columns and rows.

Example 18 includes the non-transitory computer readable medium as defined in any of examples 16 or 17, wherein the processor circuitry is to execute the instructions to operate the keyboard with a first scan matrix in the first mode, or operate the keyboard with a second scan matrix in the second mode.

Example 19 includes the non-transitory computer readable medium as defined in any of examples 16 to 18, wherein the processor circuitry is to execute the instructions to set a clock speed associated with the keyboard to a first clock speed when the keyboard is in the first mode, and a second clock speed when the keyboard is operating in the second mode.

Example 20 includes the non-transitory computer readable medium us as defined in any of examples 16 to 19, wherein the instructions cause the processor circuitry to determine whether to operate the keyboard in the first mode or the second mode based on whether a computing device communicatively coupled to the keyboard is set to a gaming mode.

Example 21 includes the non-transitory computer readable medium as defined in any of examples 16 to 20, wherein the instructions cause the processor circuitry to select keys associated with the second mode based on designated keys corresponding to software executed on a computing device communicatively coupled to the keyboard.

Example 22 includes the non-transitory computer readable medium as defined in example 21, wherein the designated keys are set by a user of the software.

Example 23 includes the non-transitory computer readable medium as defined in any of examples 16 to 22, wherein the instructions cause the processor circuitry to generate a scan matrix associated with the second mode.

Example 24 includes a method comprising determining, by executing instructions with at least one processor, whether to operate a keyboard in a first mode or in a second mode different from the first mode, the first mode corresponding to a first number of keys, the second mode corresponding to a second number of keys less than the first number of keys, and in response to determining whether to operate the keyboard in the first mode or in the second mode, setting, by executing instructions with the at least one processor, the keyboard to scan the first number of keys in the first mode, or setting the keyboard to scan the second number of keys in the second mode.

Example 25 includes the method as defined in example 24, wherein the first mode corresponds to a first number of active columns and rows, and the second mode corresponds to a second number of active columns and rows, the first number of active columns and rows greater than the second set of active columns and rows.

Example 26 includes the method as defined in an of examples 24 or 25, wherein the setting the keyboard to operate in the first mode includes setting the keyboard to operate with a first scan matrix, and wherein the setting the keyboard to operate in the second mode includes setting the keyboard to operate with a second scan matrix different from the first scan matrix.

Example 27 includes the method as defined in any of examples 24 to 26, further including setting, by executing instructions with the at least one processor, a clock speed associated with the keyboard to a first clock speed when the keyboard is operating in the first mode, and a second clock speed when the keyboard is operating in the second mode, the second clock speed greater than the first clock speed.

Example 28 includes the method as defined in any of examples 24 to 27, further including determining, by executing instructions with the at least one processor, whether a computing device communicatively coupled to the keyboard is set to a gaming mode.

Example 29 includes the method as defined in any of examples 24 to 28, further including selecting, by executing instructions with the at least one processor, keys associated with the second mode based on designated keys corresponding to software executed on a computing device communicatively coupled to the keyboard.

Example 30 includes the method as defined in any of examples 24 to 29, further including generating, by executing instructions with the at least one processor, a scan matrix associated with the second mode.

From the foregoing, it will be appreciated that example systems, methods, apparatus, and articles of manufacture have been disclosed that enable adaptive control of keyboards, thereby enabling reduced latency, as well as reduced power consumption. Further examples, disclosed herein can enable keyboards with increased refresh and/or sampling rates. Disclosed systems, methods, apparatus, and articles of manufacture improve the efficiency of using a computing device by enabling more efficient scanning of keyboard actuation/presses. Disclosed systems, methods, apparatus, and articles of manufacture are accordingly directed to one or more improvement(s) in the operation of a machine such as a computer or other electronic and/or mechanical device. Some examples disclosed herein can demonstrate latency reductions of an order of magnitude (e.g., a sixteen fold reduction in latency).

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to adaptively control operation of a keyboard, the apparatus comprising:
    at least one memory;
    machine readable instructions; and
    at least one programmable circuitry to be programmed by the machine readable instructions to:
        determine whether to operate the keyboard in a first mode or in a second mode different from the first mode, the first mode corresponding to a first number of keys, the second mode corresponding to a second number of keys less than the first number of keys, and
        set the keyboard to operate in the first mode or the second mode based on the determination, the keyboard to operate at a first clock speed when the keyboard is operated in the first mode, and the keyboard to operate at a second clock speed when the keyboard is operated in the second mode, the second clock speed different from the first clock speed.

2. The apparatus as defined in claim 1, wherein the first mode corresponds to a first number of active columns and rows, and the second mode corresponds to a second number of active columns and rows, the first number of active columns and rows greater than the second number of active columns and rows.

3. The apparatus as defined in claim 1, wherein one or more of the at least one programmable circuitry is to operate the keyboard with a first scan matrix in the first mode, or operate the keyboard with a second scan matrix different from the first scan matrix in the second mode.

4. The apparatus as defined in claim 3, wherein the first scan matrix scans at least one different key from the second scan matrix.

5. The apparatus as defined in claim 3, wherein the first scan matrix and the second scan matrix have at least one overlapping key for scanning.

6. The apparatus as defined in claim 1, wherein the second clock speed is greater than the first clock speed.

7. The apparatus as defined in claim 1, wherein one or more of the at least one programmable circuitry is to determine whether to operate the keyboard in the first mode or the second mode based on whether a computing device communicatively coupled to the keyboard is set to a gaming mode.

8. The apparatus as defined in claim 1, wherein one or more of the at least one programmable circuitry is to select keys associated with the second mode based on designated keys corresponding to software to be executed on a computing device, the keyboard associated with the computing device.

9. The apparatus as defined in claim 8, wherein the designated keys are set by a user of the software.

10. The apparatus as defined in claim 1, wherein one or more of the at least one programmable circuitry is to generate a scan matrix corresponding to the second mode.

11. The apparatus as defined in claim 1, wherein one or more of the at least one programmable circuitry is to select a subset of keys of the keyboard to be scanned in the second mode, and wherein the second clock speed is greater than the first clock speed.

12. A keyboard comprising:
    a housing;
    keys supported by the housing, ones of the keys associated with a respective row and a respective column; and
    a hub controller to set sampling of the keys in a first mode or in a second mode, the first mode corresponding to a first number of the keys, the second mode corresponding to a second number of the keys less than the first number of the keys, the hub controller to utilize a first scan matrix corresponding to a first sampling rate when the keyboard is in the first mode and utilize a second scan matrix corresponding to a second sampling rate greater than the first sampling rate when the keyboard is in the second mode.

13. The keyboard as defined in claim 12, wherein the first mode corresponds to a first number of active columns and rows, and the second mode corresponds to a second number of active columns and rows, the first number of active columns and rows greater than the second set of active columns and rows.

14. The keyboard as defined in claim 12, wherein the second scan matrix is based on assigned keys set by a user.

15. The keyboard as defined in claim 12, wherein the hub controller is to determine an operational mode of software being executed on a computing device that is communicatively coupled to the keyboard.

16. The keyboard as defined in claim 15, wherein the operational mode corresponds to a baseline operational mode or a gaming mode.

17. A non-transitory computer readable medium comprising instructions to cause at least one programmable circuitry to:
    determine whether to operate a keyboard in a first mode or in a second mode different from the first mode, the first mode corresponding to a first number of keys, the second mode corresponding to a second number of keys less than the first number of keys; and
    based on the determination, cause the keyboard to scan the first number of keys in the first mode or scan the second number of keys in the second mode, the first mode associated a first clock speed, the second mode associated with a second clock speed different from the first clock speed.

18. The non-transitory computer readable medium as defined in claim 17, wherein the first mode corresponds to a first number of active columns and rows, and the second mode corresponds to a second number of active columns and rows, the first number of active columns and rows greater than the second set of active columns and rows.

19. The non-transitory computer readable medium as defined in claim 17, wherein the instructions cause one or more of the at least one programmable circuitry to operate the keyboard with a first scan matrix in the first mode, or operate the keyboard with a second scan matrix in the second mode.

20. The non-transitory computer readable medium as defined in claim 17, wherein the instructions cause one or more of the at least one programmable circuitry to determine whether to operate the keyboard in the first mode or the second mode based on whether a computing device communicatively coupled to the keyboard is set to a gaming mode.

21. The non-transitory computer readable medium as defined in claim 17, wherein the instructions cause one or more of the at least one programmable circuitry to select keys associated with the second mode based on designated keys corresponding to software.

22. The non-transitory computer readable medium as defined in claim 21, wherein the designated keys are set by a user.

23. The non-transitory computer readable medium as defined in claim 17, wherein the instructions cause one or more of the at least one programmable circuitry to generate a scan matrix associated with the second mode, the scan matrix corresponding to a subset of keys of the keyboard.

24. A method comprising:
  determining, by executing instructions with at least one programmable circuitry, whether to operate a keyboard in a first mode or in a second mode different from the first mode, the first mode corresponding to a first number of keys, the second mode corresponding to a second number of keys less than the first number of keys, the first mode corresponding to a first clock speed, the second mode corresponding to a second clock speed different from the first clock speed; and
  in response to determining whether to operate the keyboard in the first mode or in the second mode, setting, by executing instructions with one or more of the at least one programmable circuitry, the keyboard to scan the first number of keys in the first mode, or setting the keyboard to scan the second number of keys in the second mode.

25. The method as defined in claim 24, wherein the first mode corresponds to a first number of active columns and rows, and the second mode corresponds to a second number of active columns and rows, the first number of active columns and rows greater than the second set number of active columns and rows.

26. The method as defined in claim 24, wherein the setting of the keyboard to operate in the first mode includes setting the keyboard to operate with a first scan matrix, and wherein the setting of the keyboard to operate in the second mode includes setting the keyboard to operate with a second scan matrix different from the first scan matrix.

27. The method as defined in claim 24, wherein the second clock speed is greater than the first clock speed.

28. The method as defined in claim 24, including determining, by executing instructions with one or more of the at least one programmable circuitry, whether a computing device communicatively coupled to the keyboard is set to a gaming mode.

29. The method as defined in claim 24, including selecting, by executing instructions with one or more of the at least one programmable circuitry, keys associated with the second mode based on designated keys corresponding to software executed on a computing device communicatively coupled to the keyboard.

30. The method as defined in claim 24, including generating, by executing instructions with one or more of the at least one programmable circuitry, a scan matrix associated with the second mode.

* * * * *